US005893601A

United States Patent [19]
Carlberg

[11] Patent Number: 5,893,601
[45] Date of Patent: Apr. 13, 1999

[54] VEHICLE DOOR TOP ARMREST

[76] Inventor: Linda L. Carlberg, 6239 Northfield Ave., Anaheim Hills, Calif. 92807

[21] Appl. No.: 08/800,455

[22] Filed: Feb. 18, 1997

[51] Int. Cl.$^6$ ................................................ B60J 9/00
[52] U.S. Cl. ................................................ 296/153
[58] Field of Search ............... 296/153; 297/411.22; 248/118, 118.1

[56] References Cited

U.S. PATENT DOCUMENTS

| | | | |
|---|---|---|---|
| 4,592,584 | 6/1986 | White, Jr. | 296/153 |
| 4,810,026 | 3/1989 | Doane | 296/153 |
| 4,869,543 | 9/1989 | Grimes | 296/153 |
| 5,163,646 | 11/1992 | Engelhardt | 248/118 |
| 5,320,401 | 6/1994 | Ott | 296/153 |
| 5,435,508 | 7/1995 | Deuitch et al. | 248/118 |

FOREIGN PATENT DOCUMENTS

| 1109991 | 2/1956 | France | 248/118 |
|---|---|---|---|

*Primary Examiner*—Ramon O. Ramirez

[57] ABSTRACT

A vehicle door top armrest including a conforming armrest portion having a generally oblong configuration. The armrest portion has a kidney shaped cross-section. A pair of clips are coupled between the armrest portion and an existing door panel of a door of an automobile whereby the armrest portion will be secured on an upper portion of the door frame disposed above an existing armrest of the door.

10 Claims, 5 Drawing Sheets

VEHICLE DOOR TOP ARMREST

BACKGROUND OF THE INVENTION

1. Field of the Invention

The present invention relates to a vehicle door top armrest and more particularly pertains to attaching to a car door to provide a place for comfortable placement of a driver's arm with a vehicle door top armrest.

2. Description of the Prior Art

The use of armrests is known in the prior art. More specifically, armrests heretofore devised and utilized for the purpose of supporting an arm are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these devices do not describe a vehicle door top armrest for attaching to a car door to provide a place for comfortable placement of a driver's arm.

In this respect, the vehicle door top armrest according to the present invention substantially departs from the conventional concepts and designs of the prior art, and in doing so provides an apparatus primarily developed for the purpose of attaching to a car door to provide a place for comfortable placement of a driver's arm.

Therefore, it can be appreciated that there exists a continuing need for new and improved vehicle door top armrest which can be used for attaching to a car door to provide a place for comfortable placement of a driver's arm. In this regard, the present invention substantially fulfills this need.

SUMMARY OF THE INVENTION

In the view of the foregoing disadvantages inherent in the known types of armrests now present in the prior art, the present invention provides an improved vehicle door top armrest. As such, the general purpose of the present invention, which will be described subsequently in greater detail, is to provide a new and improved vehicle door top armrest and method which has all the advantages of the prior art and none of the disadvantages.

To attain this, the present invention essentially comprises a conforming armrest portion having a generally oblong configuration. The armrest portion has a kidney shaped cross-section. The armrest portion has a generally curvilinear upper surface and a generally curvilinear lower surface. The armrest portion is comprised of a soft leather outer layer encapsulating a gel-like interior. The lower surface has a pair of recesses formed within the soft layer outer layer of the armrest portion. The device includes a pair of clips each having a generally S-shaped configuration. Each of the clips has a planar intermediate portion, a pliable upper U-shaped portion and a fixed lower U-shaped portion. Each of the fixed lower U-shaped portions are received within one of the pair of recesses of the armrest portion. A free extent of the pliable upper U-shaped portion of each clip is bendable so as to be positioned between an existing door panel and a window seal of a door of an automobile whereby the armrest portion will be secured on an upper portion of the door frame disposed above an existing armrest of the door.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle door top armrest which has all the advantages of the prior art armrests and none of the disadvantages.

It is another object of the present invention to provide a new and improved vehicle door top armrest which may be easily and efficiently manufactured and marketed.

It is a further object of the present invention to provide a new and improved vehicle door top armrest which is of durable and reliable construction.

An even further object of the present invention is to provide a new and improved vehicle door top armrest which is susceptible of a low cost of manufacture with regard to both materials and labor, and which accordingly is then susceptible of low prices of sale to the consuming public, thereby making such a vehicle door top armrest economically available to the buying public.

Even still another object of the present invention is to provide a new and improved vehicle door top armrest for attaching to a car door to provide a place for comfortable placement of a driver's arm.

Lastly, it is an object of the present invention to provide a new and improved vehicle door top armrest including a conforming armrest portion having a generally oblong configuration. The armrest portion has a kidney shaped cross-section. A pair of clips are coupled between the armrest portion and an existing door panel of a door of an automobile whereby the armrest portion will be secured on an upper portion of the door frame disposed above an existing armrest of the door.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
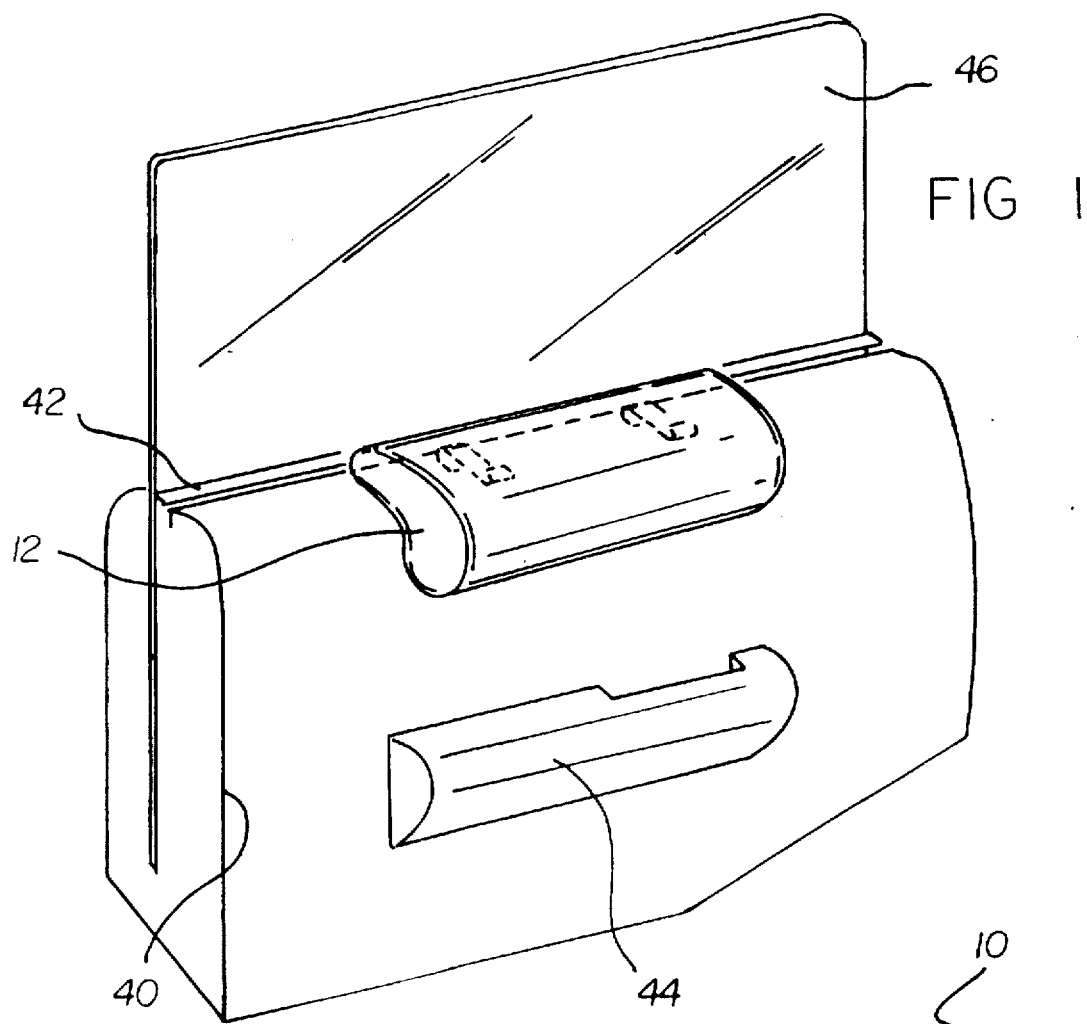
FIG. 1 is a perspective view of the preferred embodiment of the vehicle door top armrest constructed in accordance with the principles of the present invention.
Figure 2:
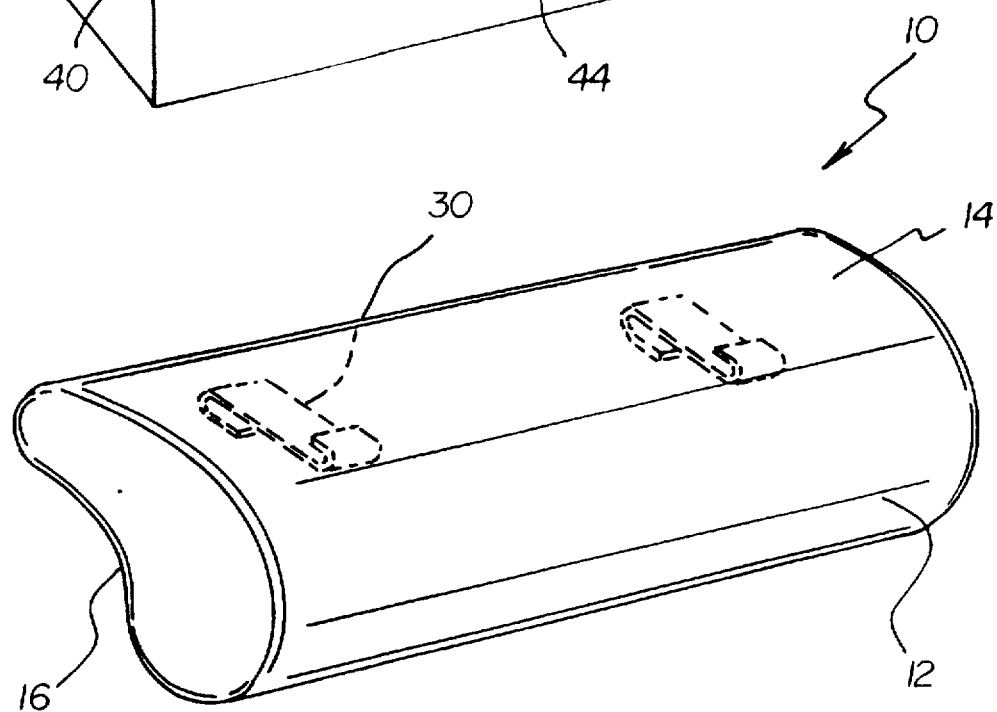
FIG. 2 is a plan perspective view of the present invention.
Figure 3:
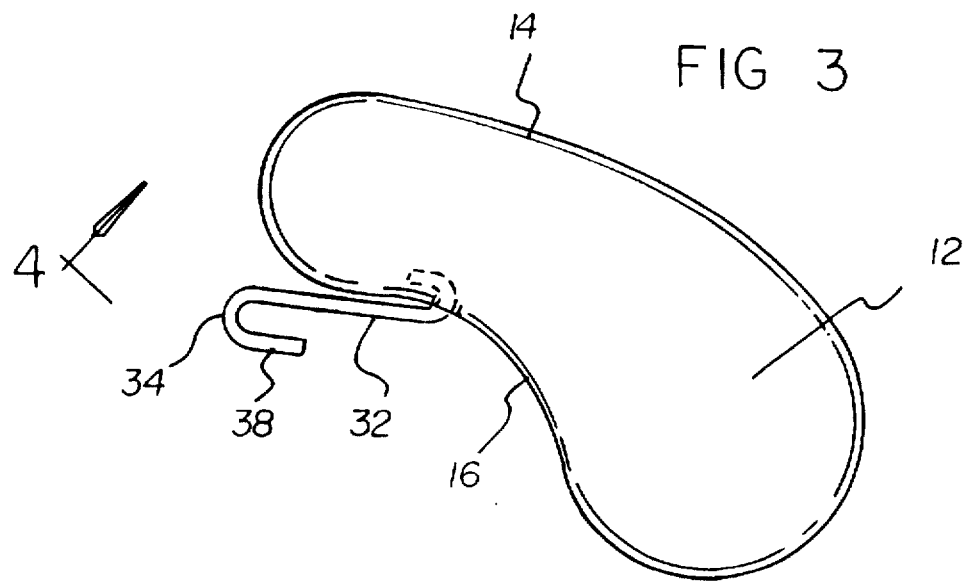
FIG. 3 is a side elevation view of the present invention.
Figure 4:
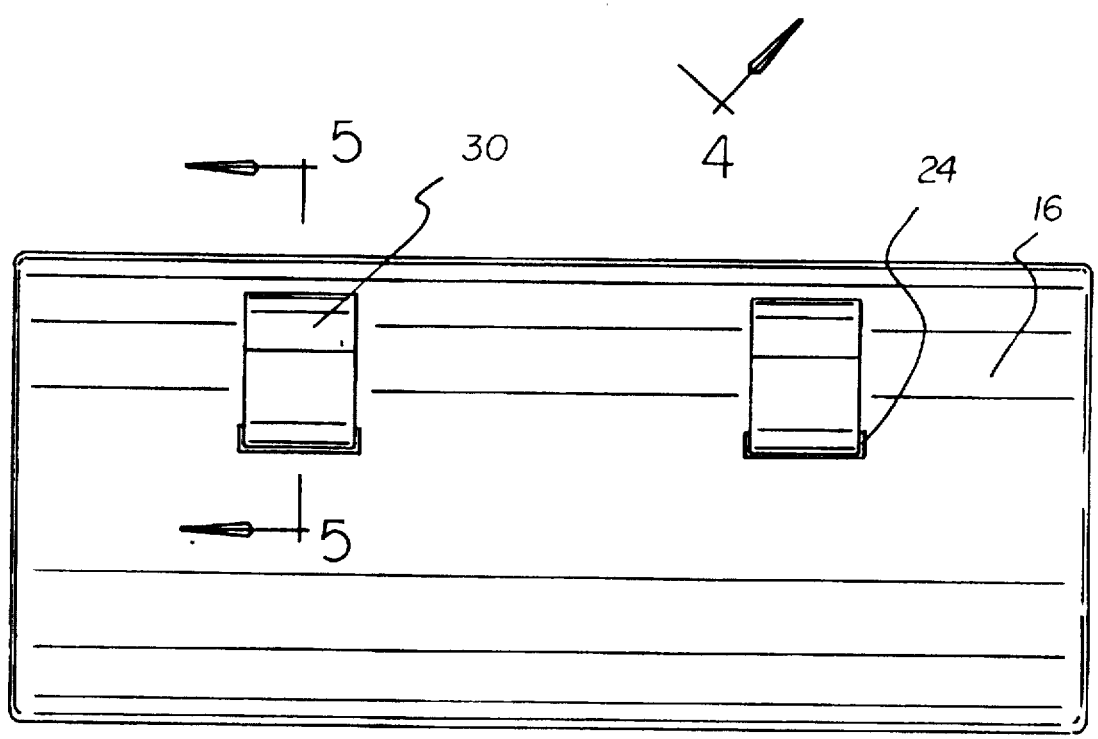
FIG. 4 is a bottom plan view of the present invention as taken along line 4—4 of FIG. 3.
Figure 5:
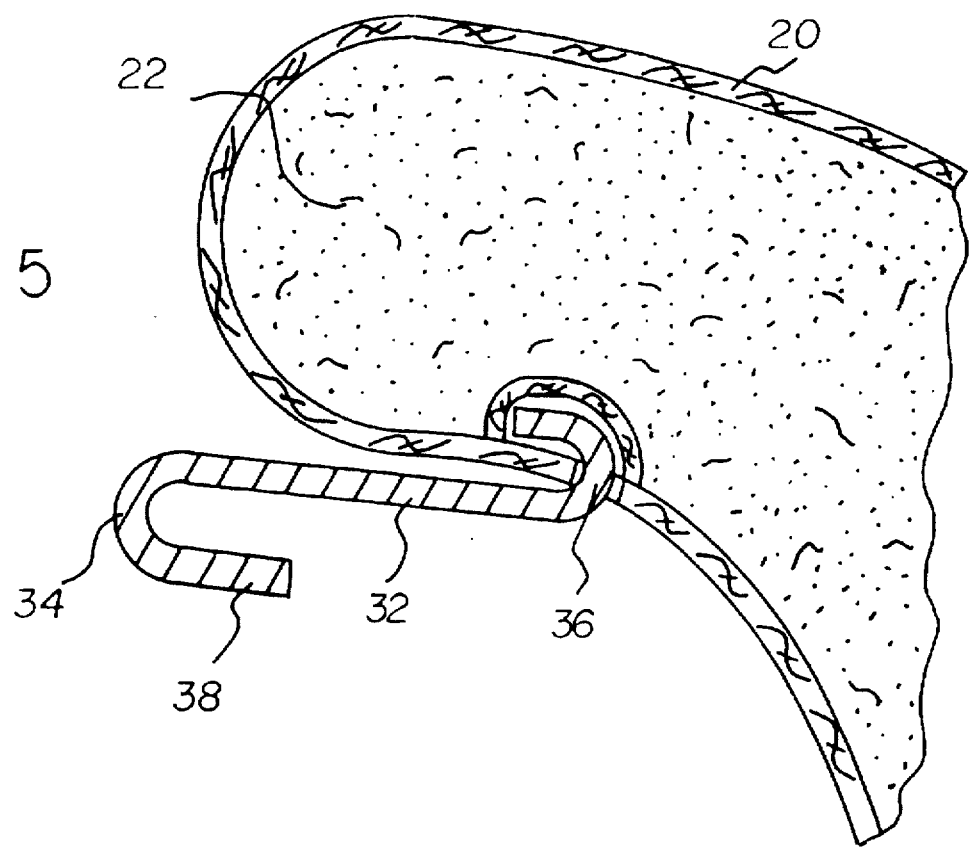
FIG. 5 is a cross-sectional view as taken along line 5—5 of FIG. 4.
Figure 6:
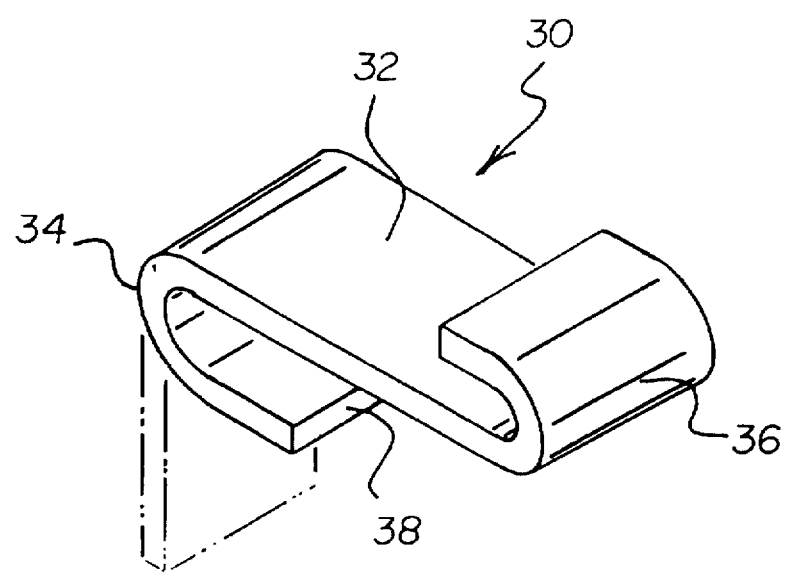
FIG. 6 is a perspective view of the clip of the present invention.

With reference now to the drawings, and in particular, to FIGS. 1 through 10 thereof, the preferred embodiment of the new and improved vehicle door top armrest embodying the principles and concepts of the present invention and generally designated by the reference number 10 will be described.

Specifically, it will be noted in the various Figures that the device relates to a vehicle door top armrest for attaching to a car door to provide a place for comfortable placement of a driver's arm. In its broadest context, the device consists of a conforming armrest portion and a pair of clips. Such components are individually configured and correlated with respect to each other so as to attain the desired objective.

The device 10 includes a conforming armrest portion 12 having a generally oblong configuration. The armrest portion 12 has a kidney shaped cross-section. Note FIG. 3. The armrest portion 12 has a generally curvilinear upper surface 14 and a generally curvilinear lower surface 16. The armrest portion 12 is comprised of a soft leather outer layer 20 encapsulating a gel-like interior 22. Note FIG. 5. The lower surface 16 has a pair of recesses 24 formed within the soft layer outer 20 layer of the armrest portion 12. The armrest portion 12 is like a bag filled with material such as gel or other loose particles. The armrest portion 12 is adapted to conform to the shape of the user's arm or the contour of an interior of a door.

Associated with the conforming armrest portion 12 are a pair of clips 30 each having a generally S-shaped configuration. Note FIG. 6. Each of the clips 30 has a planar intermediate portion 32, a pliable upper U-shaped portion 34 and a fixed lower U-shaped portion 36. Each of the fixed lower U-shaped portions 36 are received within one of the pair of recesses 24 of the armrest portion 12. Note FIG. 5. A free extent 38 of the pliable upper U-shaped portion 34 of each clip 30 is bendable so as to be positioned between an existing door panel 40 and a window seal 42 of a door of an automobile whereby the armrest portion 12 will be secured on an upper portion of the door panel 40 disposed above an existing armrest 44 of the door. Manipulation of the free extent 38 can be achieved through the use of pliers. The degree to which the free extent 38 is manipulated will depend on the make of the automobile. In automobiles where the window seal 42 does not allow for placement between the seal and the door panel, the free extent 38 is bent over the window seal 42 for placement between the window seal and a window 46 of the door. When in place on the door, gravity will cause the filling material or gel 22 to collect at a bottom edge of the armrest portion 12 thereby conforming to the door panel 40.

Figure 7:
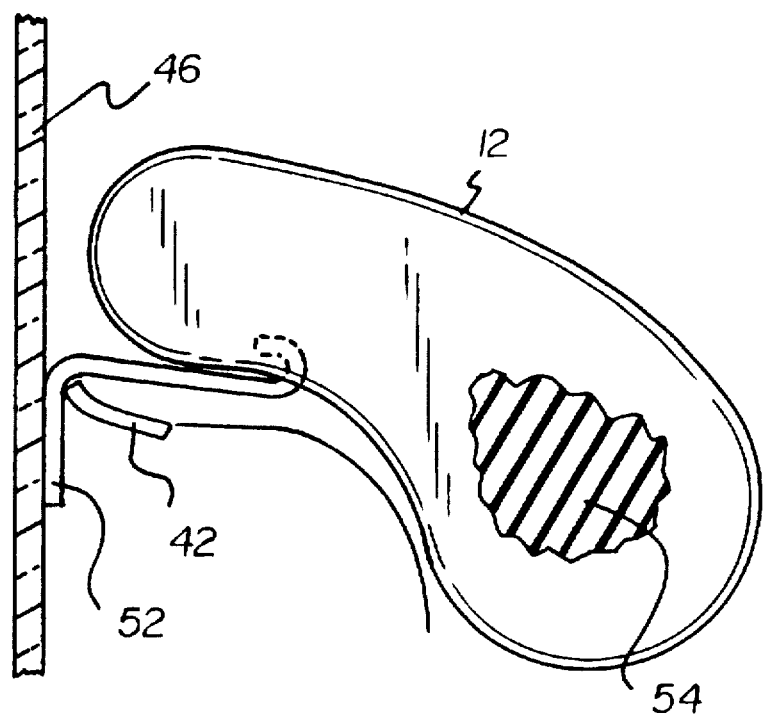
FIG. 7 is a side elevation view illustrating an alternate clip used for securement to the top of the door.
Figure 8:
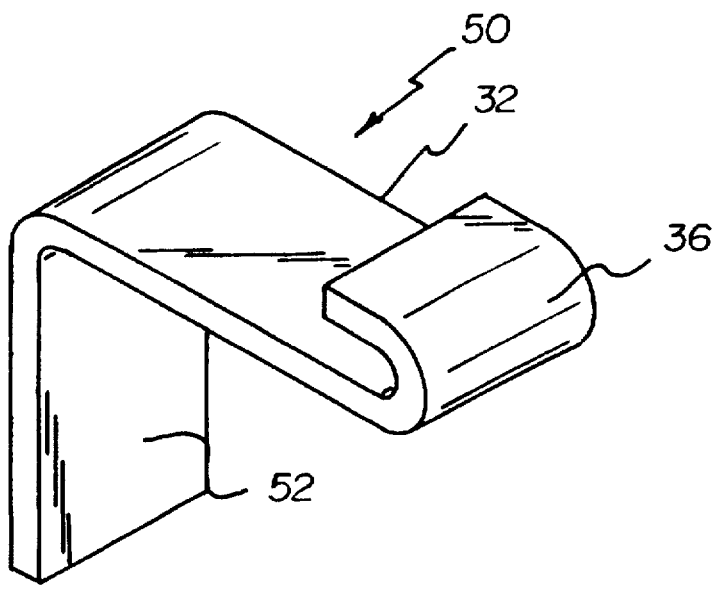
FIG. 8 is a perspective view of the alternate clip of the present invention.

FIGS. 7 and 8 illustrate an alternate clip 50 for the present invention. FIG. 7 illustrates the use of this clip positioned between the window seal and the window 46 of the vehicle. The alternate clip 50 does not have a U-shaped upper portion, but instead provides an elongated member 52 extending orthogonally from the intermediate portion 32. This elongated member 52 extends between the window seal and the window. FIG. 7 also illustrates the armrest portion 12 as being filled with a foam rubber material 54.

Figure 9:
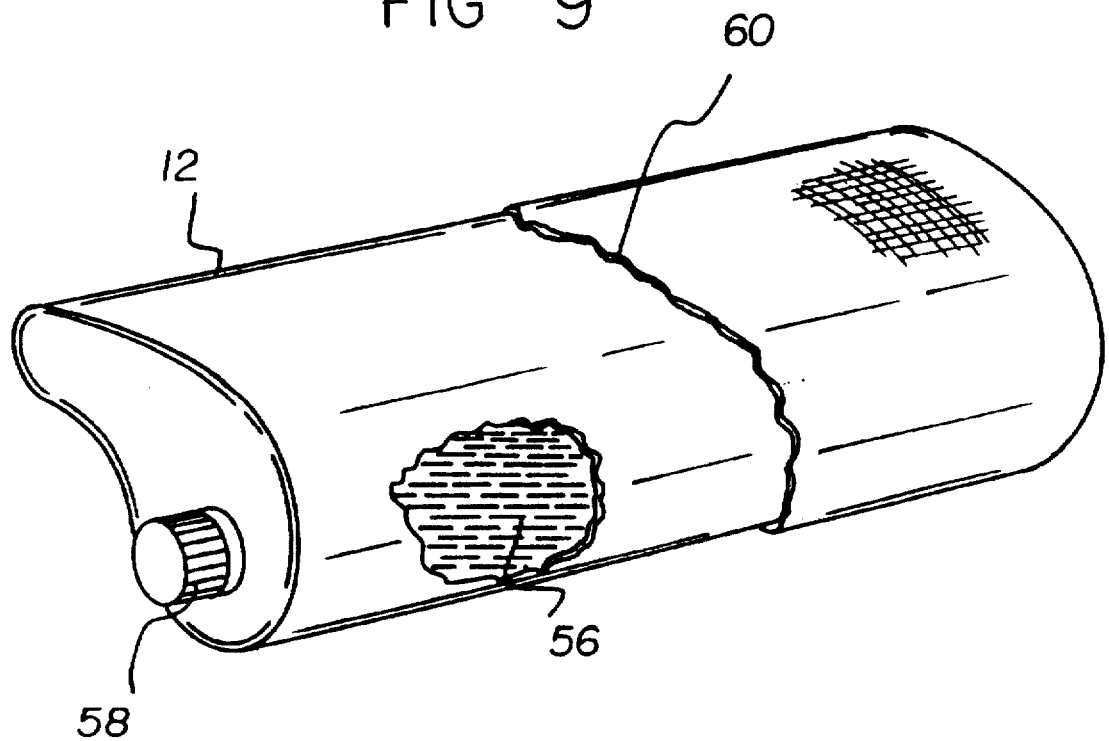
FIG. 9 is a perspective view of the armrest portion in an alternate design.

FIG. 8 of the present invention illustrates an alternate embodiment. The armrest portion 12 is provided with a water-filled interior 56. Additionally, a fill valve with cap 58 is also provided to allow this embodiment of the armrest portion 12 to be selectively filled or drained. FIG. 9 also illustrates the outer layer being of a fabric material 60.

Figure 10:
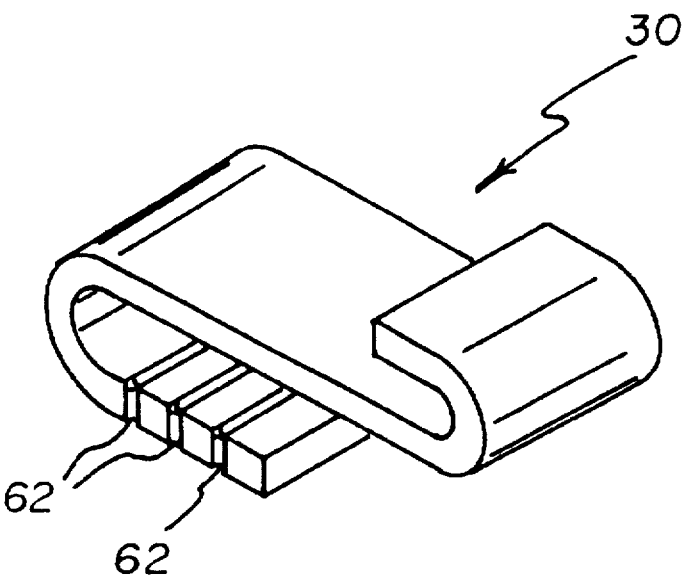
FIG. 10 is a perspective view of one of the clips illustrated with the score lines for length adjustment.

FIG. 10 illustrates an alternate embodiment for the pair of clips 30. In this embodiment, the free extent of the upper U-shaped portion 34 is provided with a plurality of score lines 62 thereon. The score lines 62 enable the size of the free extent to be adjusted simply by bending back and forth to break off a segment of the free extent to accommodate the opening to which the free extent in inserted.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicle door top armrest for attaching to a vehicle door comprising:

a conforming armrest portion having a generally oblong configuration, the armrest portion having a kidney shaped cross-section wherein both an upper portion and a lower portion of the armrest contact the vehicle door; and a pair of clips coupled between the armrest portion and an existing door panel of the door of an automobile whereby the armrest portion will be secured on an upper portion of the door frame disposed above an existing armrest of the door.

2. The vehicle door top armrest as set forth in claim 1 wherein the armrest portion having a foam rubber interior.

3. The vehicle door top armrest as set forth in claim 1 wherein the armrest portion comprised of a soft leather outer layer encapsulating a gel-like interior.

4. The vehicle door top armrest as set forth in claim 1 wherein the armrest portion having a fabric outer layer.

5. The vehicle door top armrest as set forth in claim 1 wherein the armrest portion having a water-filled interior.

6. The vehicle door top armrest as set forth in claim 5 wherein the water-filled interior of the armrest portion having a fill valve.

7. A vehicle door top armrest for attaching to a car door to provide a place for comfortable placement of a driver's arm comprising, in combination:

a conforming armrest portion having a generally oblong configuration, the armrest portion having a kidney shaped cross-section, the armrest portion having a generally curvilinear upper, surface and a generally curvilinear lower surface, the armrest portion comprised of a soft leather outer layer encapsulating a gel-like interior, the lower surface having a pair of recesses formed within the soft layer outer layer of the armrest portion; and a pair of clips each having a generally S-shaped configuration, each of the clips having a planar intermediate portion, a pliable upper U-shaped portion and a fixed lower U-shaped portion, each of the fixed lower U-shaped portions received within one of the pair of recesses of the armrest portion, a free extent of the pliable upper U-shaped portion of each clip being bendable so as to be positioned between an existing door panel and a window seal of the door whereby the armrest portion will be secured on an upper portion of the door frame disposed above an existing armrest of the door.

8. The vehicle door top armrest as set forth in claim 7 wherein the free extent of the pliable upper U-shaped portion of each clip having score lines disposed thereon.

9. A vehicle door top armrest comprising:

a conforming armrest portion having a generally oblong configuration, the armrest portion having a kidney shaped cross-section; and a pair of clips coupled between the armrest portion and an existing door panel of a door of an automobile whereby the armrest portion will be secured on an upper portion of the door frame disposed above an existing armrest of the door;

wherein the conformable armrest portion having a pair of recesses formed therein for coupling with the pair of clips; and wherein the pair of clips each having a generally S-shaped configuration, each of the clips having a planar intermediate portion, a pliable upper U-shaped portion and a fixed lower U-shaped portion, each of the fixed lower U-shaped portions received within one of the pair of recesses of the armrest portion, a free extent of the pliable upper U-shaped portion of each clip being bendable so as to be positioned between an existing door panel and a window seal of the door of the automobile.

10. A vehicle door top armrest comprising:

a conforming armrest portion having a generally oblong configuration, the armrest portion having a kidney shaped cross-section; and a pair of clips coupled between the armrest portion and an existing door panel of a door of an automobile whereby the armrest portion will be secured on an upper portion of the door frame disposed above an existing armrest of the door;

wherein the pair of clips each having a generally S-shaped configuration, each of the clips having a planar intermediate portion, a fixed upper portion and a fixed lower U-shaped portion, each of the fixed lower U-shaped portions received within one of the pair of recesses of the armrest portion, the fixed upper portion extending downwardly in an orthogonal orientation for positioning between a car door window and a window seal of the door of the automobile.

* * * * *